(12) United States Patent
DeWitt, Jr. et al.

(10) Patent No.: US 7,277,809 B1
(45) Date of Patent: Oct. 2, 2007

(54) RADIO FREQUENCY IDENTIFICATION TAG BASED SPEEDOMETER CALIBRATION

(75) Inventors: Jimmie Earl DeWitt, Jr., Georgetown, TX (US); Riaz Y. Hussain, Austin, TX (US); Frank Eliot Levine, Austin, TX (US); Enio Manuel Pineda, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/531,161

(22) Filed: Sep. 12, 2006

(51) Int. Cl.
*G08G 1/00* (2006.01)
(52) U.S. Cl. .................. 702/96; 702/104; 340/901; 340/902; 340/905; 340/907
(58) Field of Classification Search .................. 702/96, 702/104
See application file for complete search history.

(56) References Cited

U.S. PATENT DOCUMENTS

| | | |
|---|---|---|
| 3,559,756 A | 2/1971 | Torres |
| 5,177,685 A | 1/1993 | Davis et al. |
| 6,008,741 A | 12/1999 | Shinagawa et al. |
| 6,084,533 A | 7/2000 | Morgan et al. |
| 7,034,741 B2 | 4/2006 | Chon et al. |
| 2003/0016143 A1* | 1/2003 | Ghazarian .................. 340/901 |
| 2005/0065724 A1 | 3/2005 | Lee et al. |
| 2005/0165537 A1 | 7/2005 | Dort |
| 2005/0267658 A1 | 12/2005 | Yuan et al. |
| 2006/0106561 A1* | 5/2006 | Thiesen ...................... 702/104 |

OTHER PUBLICATIONS

Kane et al., "Onboard Vehicle Warning Device Using Radio Frequency Communication from external Sources Near Points of Danger", IBM Technical Disclosure Bulletin, May 1996, pp. 191-192.
"RFID Road Signs", retrieved Jun. 2, 2006, pp. 1-2. http://www.halfbakery.com/idea/RFID_20road_20signs.

* cited by examiner

*Primary Examiner*—John Barlow
*Assistant Examiner*—Sujoy Kundu
(74) *Attorney, Agent, or Firm*—Duke W. Yee; Herman Rodriquez; Peter B. Manzo

(57) ABSTRACT

A computer implemented method, apparatus, and computer usable program code for calibrating a speedometer of a vehicle. First information is received by the vehicle from a first radio frequency identification tag. Second information is received by the vehicle from a second radio frequency identification tag. A first measured speed of the vehicle is determined based on a reading from the speedometer and a second measured speed of the vehicle is determined using an elapsed time between when the first information was read and when the second information was read and a predetermined distance. The speedometer is calibrated based on a speed difference between the first measured speed and the second measured speed.

19 Claims, 4 Drawing Sheets

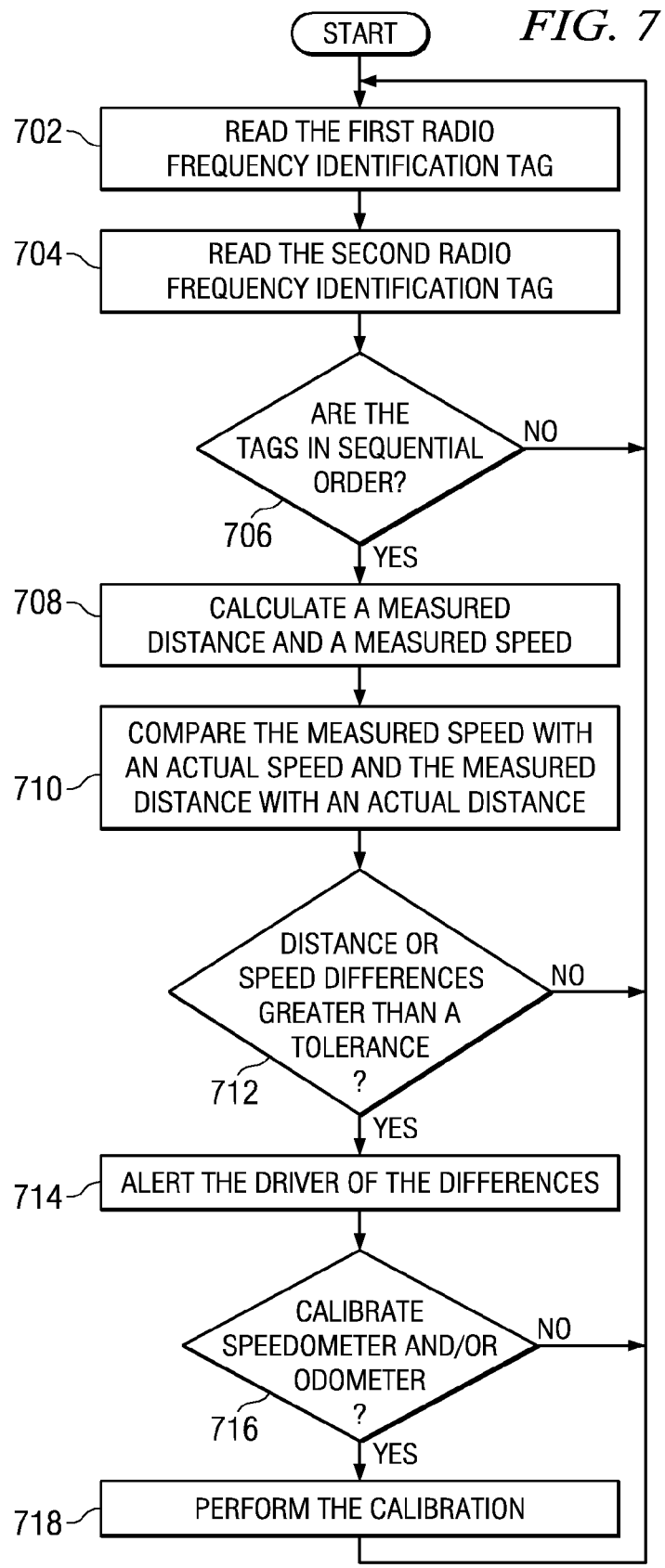

RADIO FREQUENCY IDENTIFICATION TAG BASED SPEEDOMETER CALIBRATION

BACKGROUND OF THE INVENTION

1. Field of the Invention

The present invention relates generally to an improved data processing system and in particular, to a data processing system located within a vehicle. Still more particularly, the present invention relates to a computer implemented method and apparatus for calibrating a vehicle speedometer.

2. Description of the Related Art

The use of computers has become more and more pervasive in society. This pervasiveness includes the integration of personal computers into vehicles. The utilization of computer technology is employed to provide users or drivers with a familiar environment. In this manner, a user's ability to easily use computing resources in an automobile is provided. In addition, it is envisioned that car buyers would be able to use most of the same software elements in an automobile that are used at home or in the office. Further, an automobile owner could completely customize driver information displays to create an optimal environment for the driver's needs. Various platforms have been developed and are being developed for use in automobiles and other vehicles. Many platforms provide the computing strength of a personal computer platform with widely recognized as well as emerging technologies. Widely accepted technologies that may be implemented within an automobile include cellular/global system for mobile communications (GSM), global positioning system (GPS), and radio data broadcast (RDB). These devices allow a driver to navigate, receive real-time traffic information and weather forecasts, access databases of personalized information, and place and receive telephone calls, as well as send and receive email and faxes from an automobile.

Another key feature for adapting computer technologies for use in an automobile is a voice recognition user interface for the driver along with a more conventional graphical user interface (GUI) for passengers. Voice recognition technology is already well developed in multi-media desktop personal computers. For example, VoiceType® family products, available from International Business Machines Corporation, may also be used in the automobile. Voice recognition technology allows drivers to easily control and interact with onboard computers and telephone applications, including productivity software, internet browsers, and other applications while allowing the driver to keep their hands on the wheel and their eyes on the road. Such productivity is especially important when some surveys show that up to twelve percent of a person's waking life is spent in an automobile.

With all of this emerging technology, however, a problem still exits with speedometer and odometer calibration. Many factors may cause differences between a perceived speed or distance as measured by the speedometer and odometer and the actual speed or distance. Most notably, these differences occur because of tires. For example, tires that are oversized, undersized, over-inflated, under-inflated, worn out, or otherwise changed may cause differences between the perceived speed and distance as measured by the vehicle and the actual speed and distance of the vehicle. Incorrect speed measurements may cause a driver to inadvertently violate the law or other driving parameters. The odometer is often used to calculate trip distances and provide useful information to the driver. An incorrect odometer may lead to inaccurate information or driver confusion.

SUMMARY OF THE INVENTION

The illustrative embodiments provide a computer implemented method, apparatus, and computer usable program code for calibrating a speedometer of a vehicle. First information is received by the vehicle from a first radio frequency identification tag. Second information is received by the vehicle from a second radio frequency identification tag. A first measured speed of the vehicle is determined based on a reading from the speedometer and a second measured speed of the vehicle is determined using an elapsed time between when the first information was read and when the second information was read and a predetermined distance. The speedometer is calibrated based on a speed difference between the first measured speed and the second measured speed.

BRIEF DESCRIPTION OF THE DRAWINGS

The novel features believed characteristic of the illustrative embodiments are set forth in the appended claims. The illustrative embodiments, themselves, however, as well as a preferred mode of use, further objectives, and advantages thereof, will best be understood by reference to the following detailed description of an illustrative embodiment when read in conjunction with the accompanying drawings, wherein:

FIG. 7 is a flowchart for an alternative process for calibrating a speedometer and odometer based on radio frequency identification tags in accordance with the illustrative embodiments.

DETAILED DESCRIPTION OF THE PREFERRED EMBODIMENT

Figure 1:
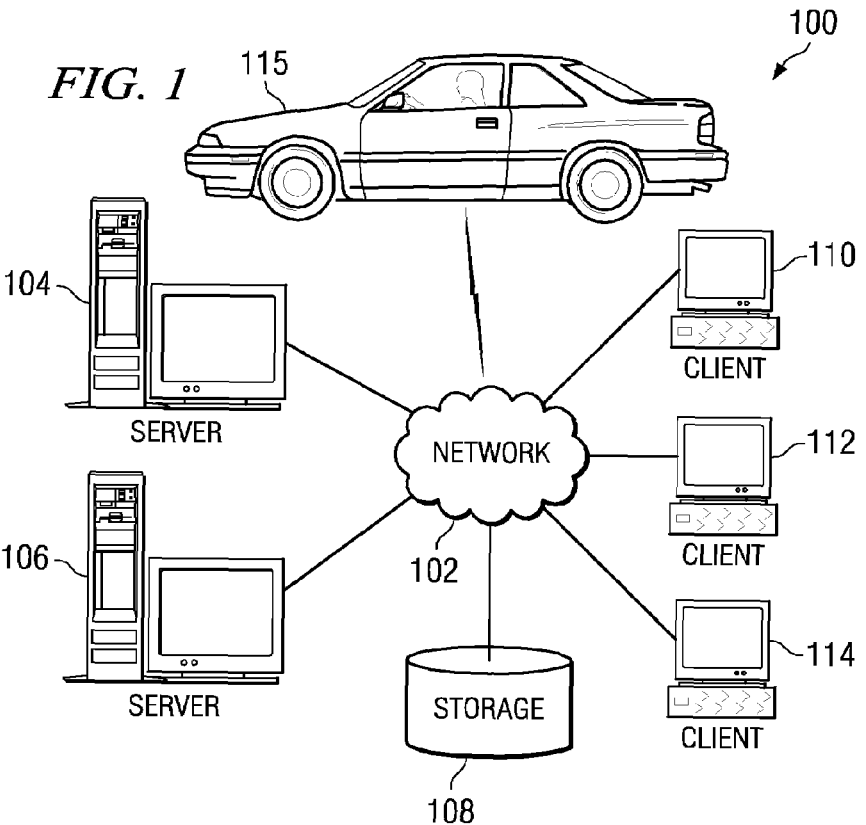
FIG. 1 is a pictorial representation of a data processing system in which the illustrative embodiments may be implemented.
Figure 2:
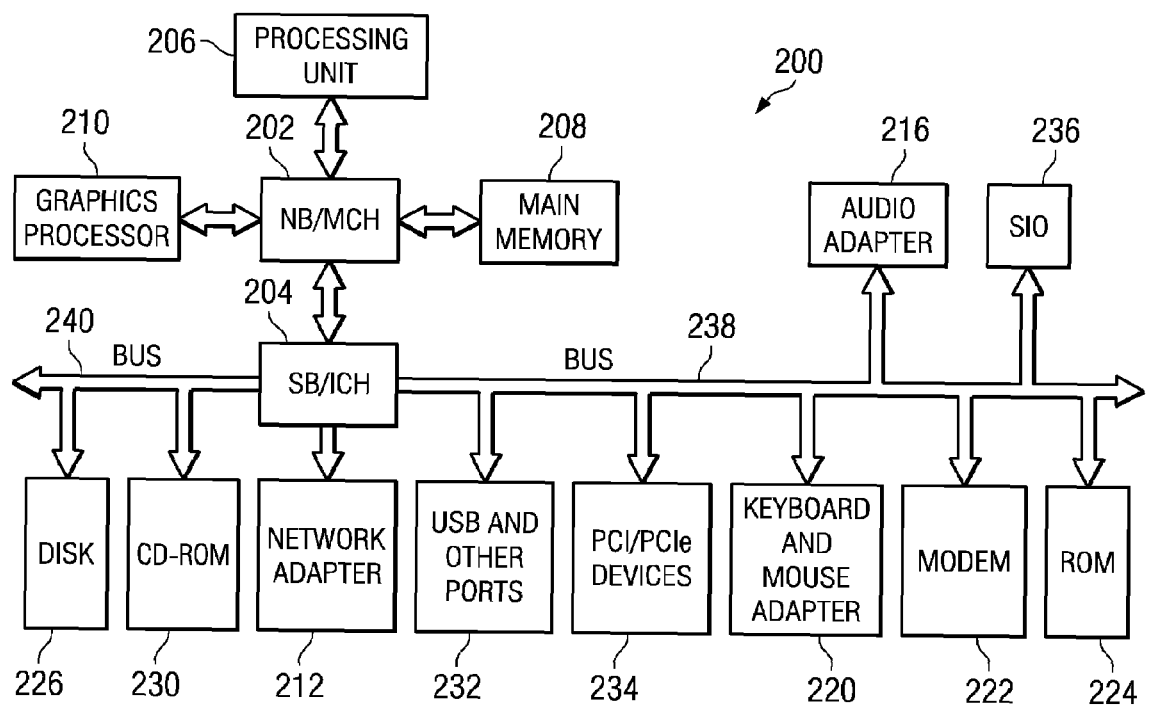
FIG. 2 is a block diagram of a data processing system in which the illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which illustrative embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. Clients 110, 112, and 114 and servers 104, 106 may be devices such as vehicles, traffic signs, traffic control devices, and other electronically linked roadway devices. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown. Network data processing system 100 includes vehicle 115. Vehicle 115 communicates with network 102 using a wireless connection or other wireless communication link which may include a wireless transmitter and receiver for sending data and other electronic information. Vehicle 115 is further described in FIG. 3.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which illustrative embodiments may be implemented. Data processing system 200 is an example of a computer, such as server 104 or client 110 in FIG. 1, in which computer usable code or instructions implementing the processes may be located for the illustrative embodiments.

In the depicted example, data processing system 200 employs a hub architecture including a north bridge and memory controller hub (MCH) 202 and a south bridge and input/output (I/O) controller hub (ICH) 204. Processor 206, main memory 208, and graphics processor 210 are coupled to north bridge and memory controller hub 202. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processor 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200 (Java and all Java-based trademarks are trademarks of Sun Microsystems, Inc. in the United States, other countries, or both).

Instructions for the operating system, the object-oriented programming system, and applications or programs are located on storage devices, such as hard disk drive 226, and may be loaded into main memory 208 for execution by processor 206. The processes of the illustrative embodiments may be performed by processor 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA. Data processing system 200 may be implemented in vehicles, which may include automobiles, trucks, motorcycles, sports utility vehicles, boats, trains, or planes. Data processing system 200 may be internally integrated or externally integrated into the vehicle.

The illustrative embodiments provide a computer implemented method, apparatus, and computer usable program code for calibrating a speedometer. Radio frequency identification (RFID) tags are embedded in a highway. A radio frequency identification tag reader on a vehicle receives information from the radio frequency identification tags as the vehicle passes over the radio frequency identification tags. The radio frequency identification tags may include information such as an exact distance or predetermined distance between the radio frequency identification tags.

For example, a road sign may indicate that calibration tags are embedded in the roadway. The driver of the vehicle may be encouraged to set the cruise control for the calibration. A radio frequency identification tag reader of the vehicle reads the first tag as the vehicle passes the first tag. The reading of the first tag is time stamped by recording or associating the time when the reader reads the first tag. The radio frequency identification tag reader may also read an exact distance to the next tag as stored in the first tag. The second radio frequency identification tag is read as the vehicle passes the second tag and it is also time stamped.

The speed and/or distance measured by the speedometer and odometer is compared against a second measured speed and/or distance of the vehicle. The difference or error may be used to calibrate the speedometer or odometer. In some embodiments, a series of radio frequency identification tags may be used to more exactly determine the second measured speed or actual speed for ongoing or continuous calibration of the speedometer.

Figure 3:
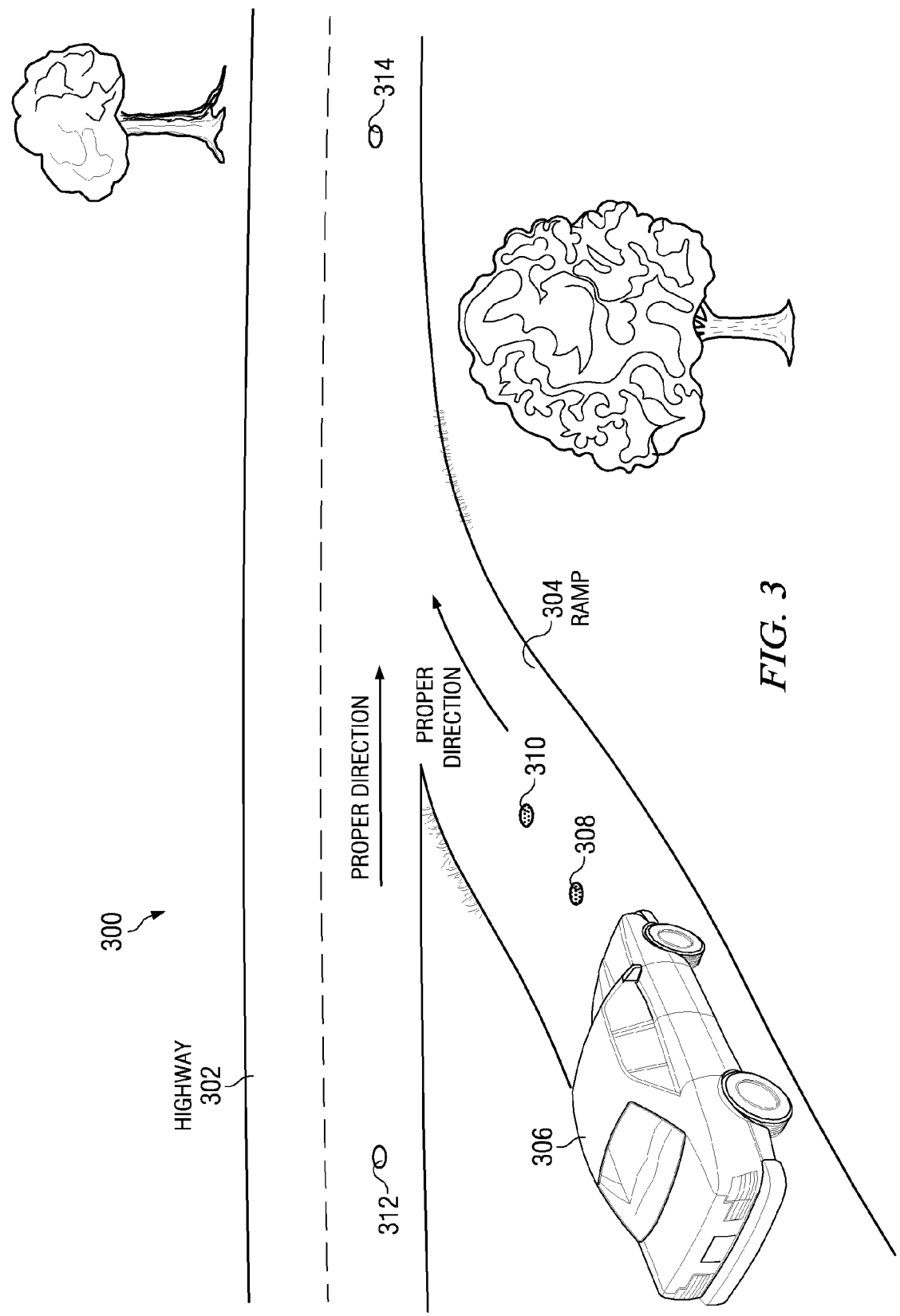
FIG. 3 is a speedometer calibration system in accordance with the illustrative embodiments.

Turning next to FIG. 3, a speedometer calibration system is depicted in accordance with the illustrative embodiments. Speedometer calibration system 300 includes various elements used to calibrate a speedometer and/or odometer. Highway 302 is a road or roadway for any form of transport. Highway 302 is also representative of roads, freeways, or other physical transportation mediums. In other illustrative embodiments, highway 302 may be a waterway, railroad tracks, bike path, tunnel, runway, or other transportation or shipping pathway. The prescribed speed along the roadway is established by laws, norms, and signs, or other rules and conventions followed or established by the people in a specified geographic region. For example, in the United States, the law establishes speed limits using regularly posted traffic signs. For example, most highways and freeways specify a speed limit between 55 and 75 miles per hour.

Highway 302 includes ramp 304. Ramp 304 is a connecting road to highway 302. Ramp 304 may be an on-ramp, frontage road or feeder road, one-way street, intersection, or other roadway for allowing traffic to enter highway 302. Vehicle 306 is a conveyance by which a person or property is or may be transported upon the highway, water, or airways. The most common types of vehicles on highway 302 may include passenger vehicles, motorcycles, busses, motor homes, bicycles, and trucks.

Radio frequency identification tags 308 and 310 are embedded in ramp 304. In one illustrative embodiment, radio frequency identification tags 308 and 310 are embedded in the middle of ramp 304 or a lane within ramp 304 so that traffic, including vehicle 306, predictably passes over radio frequency identification tags 308 and 310 before fully entering highway 302. Radio frequency identification tags 308 and 310 may also be part of lane indicators, paint, speed bumps, guard rails, curbs, reflector poles, or other roadway elements.

Radio frequency identification tags 308 and 310 are embedded within ramp 304 with a relatively close separation distance, such as twenty five or fifty feet. In another illustrative embodiment, radio frequency identification tags 312 and 314 may be embedded within highway 302 with a greater separating distance, such as a quarter mile, half mile, or full mile.

Radio frequency identification tags 308 and 310 and 312 and 314 may be referred to as a set of radio frequency identification tags. A set of radio frequency identification tags is one or more radio frequency identification tags within a specified distance. Radio frequency identification tags 308, 310, 312, and 314 are automatic devices that transmit a predetermined message in response to a predefined signal received from a radio frequency identification tag reader that is part of vehicle 306. The radio frequency identification tag reader receives or reads radio frequency identification tags 308, 310, 312, and 314 when sufficiently close to vehicle 306.

Alternatively, radio frequency identification tags 308, 310, 312, and 314 may transmit a signal that is received by the radio frequency identification tag reader of vehicle 306 periodically. For example, radio frequency identification tags 308, 310, 312, and 314 may use radar or motion detection to transmit a signal to a reader of vehicle 306. Radio frequency identification tags 308, 310, 312, and 314 may also be pressure sensitive to send a predetermined signal based on the weight or presence of vehicle 306. Radio frequency identification tags 308, 310, 312, and 314 may also use sound detection to transmit a signal to the reader of vehicle 306.

In these depicted examples, radio frequency identification tags 308, 310, 312, and 314 may also be passive radio frequency identification tags that receive, amplify, and retransmit signals on different frequencies back to vehicle 306. Passive radio frequency identification tags may include a minute antenna, integrated circuit, and memory. For example, the minute electrical current induced in an antenna of radio frequency identification tag 308 and 310 by the incoming radio frequency signal provides enough power for a CMOS integrated circuit (IC) in the tag to power up and transmit a response.

Radio frequency identification tags 308, 310, 312, and 314 may store predefined information. In these examples, radio frequency identification tags 308 and 310 store a distance, speed limit value, location, identifier, and other additional data or information. Radio frequency identification tags 308 and 310 are preferably spaced closely with a separation distance stored in one or more of radio frequency identification tags 308 and 310. An identifier or number may also be associated with each radio frequency identification tag storing a sequence value pair such as 1, 2; 349, 350; a, b; or other similar incrementing data, value, character, number, or information scheme. The values may be stored in an ordinal sequence for efficiently determining whether the vehicle has passed over a set of radio frequency identification tags used for measurement. An ordinal sequence is a classification of data groups which are arranged according to an underlying continuum. For example, if there are a set of four radio frequency identification tags embedded in highway 302 used to calibrate the speedometer, the tags may be identified by values such as 1, 2, 3, and 4. If vehicle 306 does not read all of the set of radio frequency identification tags the vehicle, may not perform a calibration based on lack of data. For example, the driver may have changed lanes, pulled off the side of the road, or otherwise affected a potential calibration data read from the set of radio frequency identification tags.

Radio frequency identification tags 308 and 310 may also store the distance, specified sequence, and the sequence values in a known bit position. Vehicle 306 may determine a second measured speed or actual speed and distance traveled based on the values stored in radio frequency identification tags 308 and 310. For example, when vehicle 306 passes over radio frequency identification tag 308, radio frequency identification tag 308 is read by the radio frequency identification tag reader of vehicle 306 and associated with a time, such as 14:50:21:50 corresponding to the exact time that radio frequency identification tag 308 is read. The time recorded by the radio frequency identification tag reader is a time stamp.

The time stamp may be read and recorded as precisely as milliseconds or even more precisely for more accurate calibrations. In one example, the radio frequency identification tag reader may read a character "A" specifying sequence and a value "25" specifying a separation distance of twenty five feet, from radio frequency identification tag 308 as a predetermined message. Subsequently, when vehicle 306 passes over radio frequency identification tag 310, the character "B" and value "25" may be read by the radio frequency identification tag reader of vehicle 306. Radio frequency identification tag 310 is time stamped as 14:50:21:74, indicating that vehicle 306 traveled the exact distance between radio frequency identification tags 308 and 310 specified as 25 feet in 24 milliseconds indicating that the vehicle is traveling at 70 miles per hour. The radio frequency identification tag reader may also use a timer similar to a stopwatch to determine the time required for vehicle 306 to read two or more tags. The timer may be started at radio frequency identification tag 308 and stopped at radio frequency identification tag 310 to determine the elapsed time required for vehicle 306 to travel the predetermined distance between radio frequency identification tags 308 and 310.

This actual speed may be compared against the speed measured by the speedometer. If the actual speed and measured speed are not within an acceptable tolerance, such as two miles per hour, the speedometer is automatically calibrated. Alternatively, the measurements may be used by the computer system of vehicle 306 to prompt the driver whether the speedometer should be recalibrated based on the readings. The determination to calibrate the speedometer may be based on the decisions and input of the driver.

The distance and tag identification stored in radio frequency identification tags 308 and 310 are used to measure the actual speed of vehicle 306.

The information read from radio frequency identification tags 308 and 310 may be used by the computer system, navigation system, or other logical components of vehicle 306 to provide the driver with an audio, visual, tactile, or other alerts that the speedometer or odometer calibration of vehicle 306 is incorrect. The computer system of vehicle 306 may also communicate an alert to oncoming traffic, pedestrians, police/emergency personnel, road signals, or other components or persons that may be in danger. The computer system of vehicle 306 may also provide information to others if the speed of the vehicle has approached a predetermined threshold. For example, vehicle 306 may have been stolen and the driver of vehicle 306 may be exceeding 110 miles per hour on a freeway. The computer system of vehicle 306 may send an alert message to freeway signs alerting the driver of vehicle 306 and other drivers of the dangerous behavior.

In other examples, sets of associated radio frequency identification tags with ordinal sequential values, such as radio frequency identification tags 308 and 310, may be embedded in each lane of ramp 304 ensuring that vehicle 306 reads the values stored in radio frequency identification tags 308 and 310 regardless of physical position on ramp 304. In another example, radio frequency identification tags 308 and 310 may be installed at natural choke points or narrowing points, such as bridges, ensuring that vehicle 306 passes over them.

In one embodiment, traffic signs may indicate that vehicle 306 is approaching a calibration section of highway 302 beginning with radio frequency identification tag 312. The driver may be encouraged by road signs to maintain a constant speed or use cruise control if the driver would like to calibrate the speedometer or odometer of vehicle 306. In one example, radio frequency identification tags 312 and 314 are placed along a straight and flat stretch of highway 302 for calibration purposes.

A longer distance between radio frequency identification tags 312 and 314 may be especially useful for calibrating the odometer of vehicle 306. The radio frequency identification tag reader of vehicle 306 may record a first exact distance indicated by the odometer when radio frequency identification tag 312 is read. Radio frequency identification tag 312 may indicate that radio frequency identification tags 312 and 314 are separated by exactly one mile and may store numerical identifiers, such as 558 and 559 that may be read by vehicle 306. The radio frequency identification tag reader of vehicle 306 records a second exact distance indicated by the odometer when radio frequency identification tag 314 is read. Radio frequency identification tags 312 and 314 may also be used to calibrate the speedometer.

Closer spaced radio frequency identification tags 308 and 310 may allow for more accurate speedometer calibration because of the decreased likelihood of acceleration or deceleration of the vehicle between radio frequency identification tags 308 and 310. Radio frequency identification tags 312 and 314 may allow for more accurate odometer readings because of the greater sample distance. Radio frequency identification tags 308, 310, 312, and 314 are preferably located in sections of ramp 304 or highway 302 where speed is constant based on traffic patterns, physical environment, road conditions, and other factors, conditions, or stimulus that may affect the driver of vehicle 306 to ensure accurate calibration results.

In an illustrative embodiment, the speed of vehicle 306 as read by a vehicle and transmitted to a device or determined by radio frequency identification tags 308, 310, 312, and 314 may be displayed to the driver for reference purposes. For example, the speed of vehicle 306 may be flashed on to a sign next to highway 302 or a dashboard display for comparison with other measured speed indicators.

Figure 4:
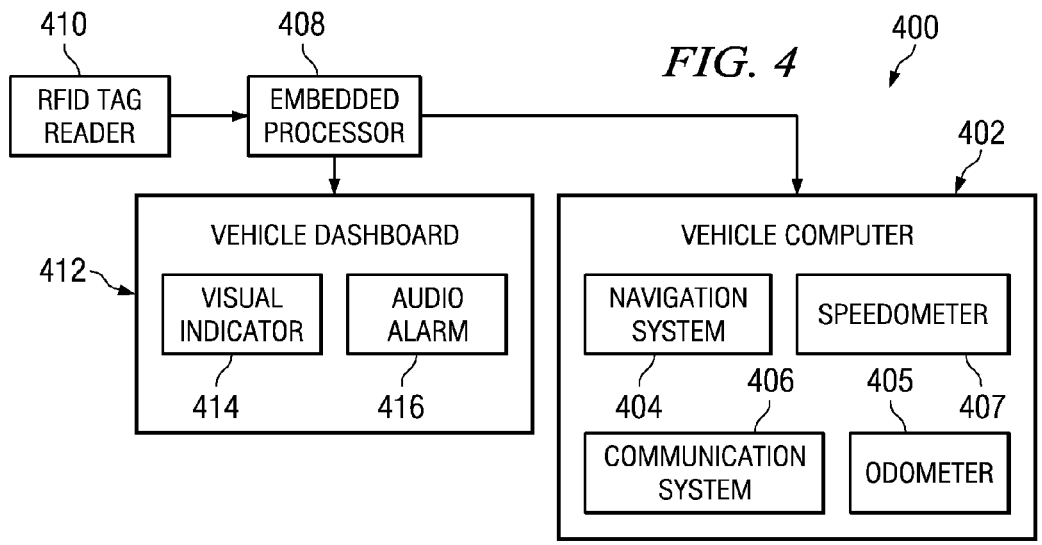
FIG. 4 is a block diagram of an automotive computing platform in accordance with the illustrative embodiments.

With reference next to FIG. 4, a block diagram of an automotive computing platform is depicted in accordance with the illustrative embodiments. Automotive computing platform 400 is the data processing system of a vehicle, such as vehicle 306 of FIG. 3. Automotive computing platform 400 may be implemented in a device, such as client 110 of FIG. 1 and may be configured similar to data processing system 200 of FIG. 2. Automotive computing platform 400 includes various hardware components which may include vehicle computer 402, navigation system 404, odometer 405, communication system 406, speedometer 407, embedded processor 408, radio frequency identification tag reader 410, vehicle dashboard 412, visual indicator 414, and audio alarm 416.

In exemplary automotive computing platform 400, vehicle computer 402 includes navigation system 404, communication system 406, speedometer 407, and odometer 405. Vehicle computer 402 receives information from the different systems and mechanisms of the vehicle in order to control vehicle functions.

Navigation system 404 provides navigational information to vehicle computer 402 which may be displayed to the driver. In these examples, navigation system 404 may be a global positioning system including an antenna and global positioning system receiver. Navigation system 404 allows the user to interactively enter and receive geographic information. Communication system 406 includes communication components for communicating with other users or devices. Communication system 406 may communicate with other devices, such as server 104, clients 112 and 114 through network 102 all of FIG. 1. For example, communication system 406 may use a wireless signal to communicate with other drivers, signs, cell phones, or other communication enabled devices.

Embedded processor 408 processes information and data for vehicle computers. Radio frequency identification tag reader 410 reads radio frequency identification tags, such as radio frequency identification tags 308, 310, 312, and 314 of FIG. 3. In one embodiment, radio frequency identification tag reader 410 is positioned on the bottom of the vehicle in order to increase the efficiency of transmitting a signal and receiving the radio frequency identification tag information. Radio frequency identification tag reader 410 may function to read values and information from radio frequency identification tags within a near proximity of the vehicle to effectively calibrate odometer 405 and speedometer 407.

Alternatively, the information from radio frequency identification tag reader 410 is processed by embedded processor 408 to determine the actual speed. Embedded processor 408 may compare the actual speed of the vehicle against the speedometer and odometer measured speeds and distances. For example, if embedded processor 408 determines speedometer 407 is off by three miles per hour, and the mile measurements of odometer 405 are off by 0.25 miles, speedometer 407 and odometer 405 may be automatically calibrated or calibrated based on input from the driver.

The speed information or values extracted from radio frequency identification tags may also be passed to communication system 406. Communication system 406 may send a message to individuals or objects if the speed of the vehicle has surpassed a safe driving speed, such as 110 miles per hour. The safe driving speed may be established by traffic laws and regulations, towns or municipalities, law enforcement officials, or by a default setting. In some countries, there will not be a safe driving speed. For example, vehicles meant to be driven on the Autobahn of Germany in some locations do not have a designated safe driving speed. In one instance, communication system 406 may send a message to a road signal, warning oncoming drivers that there is a vehicle traveling in excess of 110 miles per hour. In another example, a message from communication system 406 may be passed to an automated system for alerting all pedestrians with cell phones and communication-enabled vehicles in the path of the oncoming vehicle.

If the vehicle has far exceeded an established safe driving speed, an alert or alarm may be displayed to the driver in vehicle dashboard 412. In these examples, vehicle dashboard 412 may include visual indicator 414 and audio alarm 416. Visual indicator 414 is a visual alert of vehicle speed. The visual alert may be displayed or flashed to vehicle instruments, warning lights, seat vibrator, or heads-up displays. In one illustrative embodiment, all of the lights in the vehicle may begin to flash to attract the attention of the driver. Additionally, the tail light flashers, visible from the dashboard, and head lights may be caused to blink.

Audio alarm 416 is an audio alert that the vehicle has far exceeded a safe driving speed. For example, audio alarm 416 may have an audio portion of navigation system 404 repeat "You are traveling at one hundred ten miles per hour". The audio alarm may also be a whistle, beep, ping, or other sound to attract the attention of the driver. Audio alarm 416 may also sound the horn of the vehicle to warn other drivers.

In other embodiments, different alerts, indicators, or alarm systems may be used. For example, the driver's seat or steering wheel may vibrate to indicate the vehicle has far exceeded a safe driving speed. In another example, vehicle computer 402 may activate a speed governor. Vehicle computer 402 may also activate the braking system to decelerate the vehicle based on the location of the vehicle, such as when the vehicle is approaching a school or construction zone.

Multiple sets of radio frequency identification tags embedded in or near the roadway may be used to indicate average speed, trip distance, or provide other reference information. The radio frequency identification tags may also be used in conjunction with navigation system 404 to indicate known distances from specified geographic locations.

Figure 5:
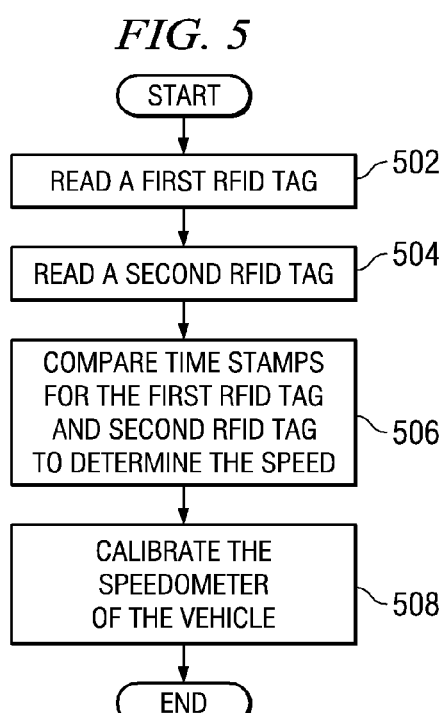
FIG. 5 is a flowchart for a process for calibrating a speedometer based on radio frequency identification tags in accordance with the illustrative embodiments.

Turning next to FIG. 5, a flowchart for a process for calibrating a speedometer based on radio frequency identification tags is depicted in accordance with the illustrative embodiments. The process of FIG. 5 may be implemented by components of automotive computing platform 400 or embedded processor 408 of FIG. 4 in vehicle 306 of FIG. 3. In another embodiment, the process of FIG. 5 may be performed entirely by radio frequency identification tag reader 410 of FIG. 4.

The process begins by reading a first radio frequency identification tag (step 502). The first tag may be a tag, such as radio frequency identification tags 308, 310, 312, and 314 of FIG. 3. Next, the process reads a second radio frequency identification tag (step 504). During the reading process of steps 502 and 504, the radio frequency identification tag reader may associate a time stamp associated with the instant in time each of the radio frequency identification tags were read. The radio frequency identification tag reader may also read a tag identifier and a specified distance between radio frequency identification tags, such as 50 feet. The tag identifier ensures that the first radio frequency identification tag read was sequential in order with the second radio frequency identification tag for accurate speed determination. If the tag identifiers are not within a prescribed order, the readings may be disregarded altogether. The radio frequency identification tags are preferably embedded in sets in a roadway, such as highway 302 of FIG. 3.

Next, the process compares a time stamp for the first radio frequency identification tag with a time stamp for the second radio frequency identification tag to determine the speed of the vehicle (step 506). Step 506 may be performed by embedded processor 408 of FIG. 4, based on information extracted from radio frequency identification tags by radio frequency identification tag reader 410 of FIG. 4. For example, the second time stamp may be subtracted from the first time stamp to determine an elapsed time between the radio frequency identification tags. Speed is the measurement of distance per time period. The distance is an exact distance read from the radio frequency identification tags that is divided by the elapsed time to determine the speed of the vehicle.

Next, the process calibrates the speedometer of the vehicle (step 508) with the process terminating thereafter. The calibration may be performed by vehicle computer 402 for speedometer 407, both of FIG. 4. The calibration ensures that the vehicle is displaying proper speedometer readings regardless of tire conditions or other related factors.

Figure 6:
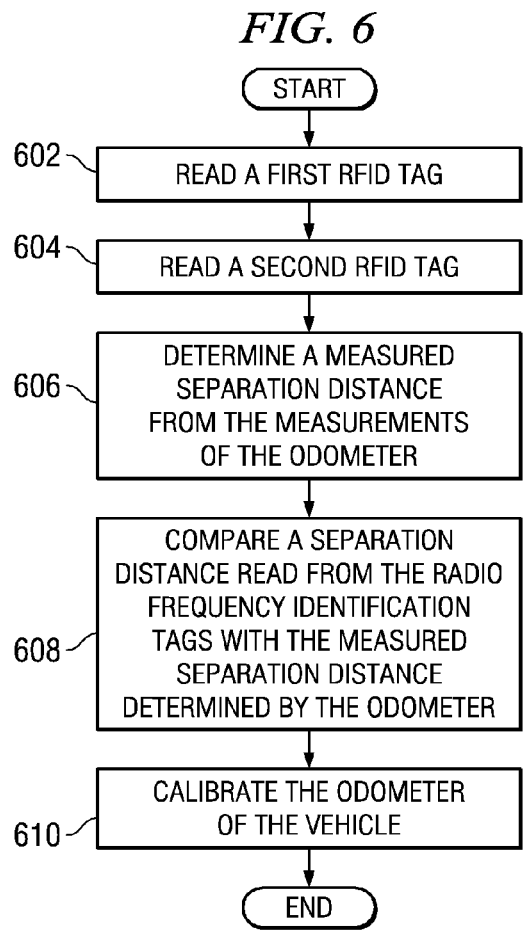
FIG. 6 is a flowchart for a process for calibrating an odometer based on radio frequency identification tags in accordance with the illustrative embodiments.

Turning next to FIG. 6, a flowchart for a process for calibrating an odometer based on radio frequency identification tags is depicted in accordance with the illustrative embodiments. The process of FIG. 6 may be implemented by components of automotive computing platform 400 or embedded processor 408 of FIG. 4 in vehicle 306 of FIG. 3.

In another embodiment, the process of FIG. 6 may be performed entirely by radio frequency identification tag reader 410 of FIG. 4.

The process begins by reading a first radio frequency identification tag (step 602). The first tag may be a tag, such as radio frequency identification tags 308, 310, 312, and 314 of FIG. 3. Next, the process reads a second radio frequency identification tag (step 604). The radio frequency identification tags may read a tag identifier and separation distance for each tag in steps 602 and 604. Additionally, as each tag is read in steps 602 and 604, the radio frequency identification tag associates an exact odometer reading with each radio frequency identification tag. The odometer may be odometer 405 of FIG. 4. The radio frequency identification tags are preferably embedded in sets or groups in a roadway, such as highway 302 of FIG. 3.

Next, the process determines a measured separation distance from the measurements of the odometer (step 606). Step 606 may be performed by embedded processor 408 of FIG. 4, based on information extracted from radio frequency identification tags by radio frequency identification tag reader 410 of FIG. 4. The measured separation distance is determined by the odometer readings of step 602 and 604.

Next, the process compares a separation distance read from the radio frequency identification tags with the measured separation distance determined by the odometer (step 608). The result of step 608 indicates an error measurement or distance differential for the odometer. The comparison of step 608 may be performed by embedded processor 408 of FIG. 4. For example, the actual separation distance may be exactly 1.00 miles, and the odometer measurement may be 0.98 miles indicating that the odometer is off by 0.02 miles per mile traveled. Next, the process calibrates the odometer of the vehicle (step 610) with the process terminating thereafter. The calibration may be performed by vehicle computer 402 for odometer 405, both of FIG. 4. The calibration ensures that the vehicle is displaying proper odometer readings regardless of tire conditions or other related factors.

With reference to FIG. 7, a flowchart for an alternative process for calibrating a speedometer and odometer based on radio frequency identification tags is depicted in accordance with the illustrative embodiments. The process of FIG. 7 may be implemented by components of automotive computing platform 400 or embedded processor 408 of FIG. 4 in vehicle 306 of FIG. 3. In another embodiment, the process of FIG. 7 may be performed entirely by radio frequency identification tag reader 410 of FIG. 4.

The process begins by reading a first radio frequency identification tag (step 702). The first tag may be a tag, such as radio frequency identification tags 308, 310, 312, and 314 of FIG. 3. Next, the process reads a second radio frequency identification tag (step 704). The radio frequency identification tags may read a tag identifier and actual separation distance for each tag in steps 702 and 704. Additionally, as each tag is read in steps 702 and 704, the radio frequency identification tag associates a time stamp and exact odometer reading with each radio frequency identification tag.

Next, the process determines whether the radio frequency identification tags are in sequential order (step 706). The determination of step 706 may be made by embedded processor 408 of FIG. 4 based on information read from the radio frequency identification tags by radio frequency identification tag reader 410 of FIG. 4. The sequential order may be an ordinal sequence such as 1, 2, . . . or a repeating ordinal sequence such as 0, 1, 2, 0, 1, 2, . . .

If the process determines the radio frequency identification tags are not in sequential order, the results read from the radio frequency identification tags are inconclusive and the process returns to step 702. If the process determines the radio frequency identification tags are in sequential order in step 706, the process calculates a measured speed and measured distance (step 708). The speed and distance are calculated based on the measurements by the odometer and speedometer, such as odometer 405 and speedometer 407 of FIG. 4.

Next, the process compares the measured speed with an actual speed and the measured distance with an actual distance (step 710). The actual speed is calculated based on a known separation distance specified by the radio frequency identification tags and the amount of time that passed between the reading of the radio frequency identification tags. The actual distance is the known separation distance read from the tags by the radio frequency identification tag reader. The comparison made in step 710 may be used to determine speed and distance differences, such as +2 mph and −0.01 mile per mile traveled.

Next, the process determines whether the speed or distance differences are greater than a tolerance (step 712). The tolerance may be a default value set by the vehicle manufacturer or the driver indicating the significance of incorrect speed and distance measurements.

If the distance or speed differences are not greater than a tolerance, the process returns to step 702. If the distance or speed differences are greater than a tolerance in step 712, the process alerts the driver of the differences (step 714). For example, the driver or speedometer or odometer manufacturer may have established that if the actual speed is off by more than two miles per hour, the driver should be alerted. The driver may be alerted using visual indicator 414 and audio alarm 416 of FIG. 4. Next, the process determines whether to calibrate the speedometer and/or odometer (step 716). The determination of 716 is made based on input from the user. For example, the user may provide input to calibrate the speedometer or odometer. Both the speedometer and odometer may be calibrated together or separately.

If the process determines not to calibrate the speedometer and/or odometer, the process returns to step 702. If the process determines to calibrate the speedometer and/or odometer in step 716, the process performs the calibration (step 718) and returns to step 702 thereafter.

The process of FIG. 7 may be continuously repeated. The driver may have the option of setting a preference in the vehicle to enable the vehicle to ignore calibration data using radio frequency identification tags. The process of FIGS. 5-7 are illustrated with a set of two radio frequency identification tags. In other embodiments, any number of radio frequency identification tags may be used for greater accuracy and more precise calibration. Additionally, the vehicle may require that the radio frequency identification tags be read a specified number of times to determine an average error before the speedometer and/or odometer are calibrated based on the average error to further ensure accuracy of the calibration.

Thus, the illustrative embodiments provide a computer implemented method, apparatus, and computer usable program code for indicating radio frequency identification tags may be used to indicate the speed of the vehicle. Information stored within the radio frequency identification tags and read by the radio frequency identification tag reader may be used in conjunction with the time between each radio frequency identification tab being read to indicate a current speed. Multiple sets of radio frequency identification tags may be used to indicate average speed or trip distance. This speed may also be used to calibrate the speedometer of the vehicle.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for calibrating a speedometer of a vehicle, the computer implemented method comprising:
    receiving first information from a first radio frequency identification tag by the vehicle;
    receiving second information from a second radio frequency identification tag by the vehicle;
    determining a first measured speed of the vehicle based on a reading from the speedometer;
    determining a second measured speed of the vehicle based on dividing a predetermined distance provided by at least one of the first information or the second information by an elapsed time between when the first information was read and when the second information was read; and
    calibrating the speedometer based on a speed difference between the first measured speed and the second measured speed, wherein the calibrating is performed based on driver input.

2. The computer implemented method of claim 1, wherein the first information includes the predetermined distance and a first radio frequency identifier, and wherein the second information includes the predetermined distance and a second radio frequency identifier.

3. The computer implemented method of claim 1, wherein a first time stamp identifies when the first information was received, wherein a second time stamp identifies when the second information was received, and wherein the second time stamp is subtracted from the first time stamp to determine the elapsed time.

4. The computer implemented method of claim 1, wherein the elapsed time is determined by a timer.

5. The computer implemented method of claim 2, further comprising:
    determining whether the first radio frequency identification tag and the second radio frequency identification tag are in a predetermined sequence based on the first radio frequency identifier and the second radio frequency identifier for determining whether the second measured speed determined is accurate.

6. The computer implemented method of claim 5, further comprising:
    responsive to determining the second radio frequency identification tag is not in the predetermined sequence with the first radio frequency identification tag, disregarding the second measured speed for calibration purposes.

7. The computer implemented method of claim 1, wherein the vehicle is any of a car, truck, bus, train, bicycle, motorcycle, boat, or plane on a ground surface, and wherein the vehicle is equipped with a radio frequency identification tag reader.

8. The computer implemented method of claim 1, further comprising:
    reading the first radio frequency identification tag;
    reading the second radio frequency identification tag;
    comparing read times for the first radio frequency identification tag and the second radio frequency identification tag to determine the elapsed time; and
    calculating the second measured speed based on the elapsed time and the predetermined distance.

9. The computer implemented method of claim 5, wherein the predetermined sequence is any of characters, numbers, and values in an ordinal sequence.

10. The computer implemented method of claim 9, wherein the ordinal sequence is a repeating ordinal sequence.

11. The computer implemented method of claim 1, wherein the receiving, determining, and calibrating steps are performed continuously while the vehicle is in motion.

12. The computer implemented method of claim 1, further comprising:
    determining whether the speed difference is greater than a tolerance;

responsive to a determination that the speed difference is less than the tolerance, disregarding the second measured speed for calibration purposes.

13. The computer implemented method of claim 1, further comprising:
recording a first odometer reading when the information is received from the first radio frequency identification tag;
recording a second odometer reading when the information is received from the second radio frequency identification tag;
comparing a measured distance based on the first odometer reading and the second odometer reading with the predetermined distance to determine a distance difference; and
calibrating an odometer based on the distance difference.

14. The computer implemented method of claim 1, wherein the first radio frequency identification tag and the second radio frequency identification tag are activated by any of vehicle pressure, motion, sound or proximity of a radio frequency identification tag reader.

15. A speedometer calibration system comprising:
a roadway including a set of radio frequency identification tags including at least a first tag and a second tag;
a vehicle including a computing platform wherein the computing platform further comprises:
a radio frequency identification tag reader for receiving first information from the first tag and second information from the second tag and associating a first time stamp with a time when the first information is received and a second time stamp with a time when the second information is received, wherein the first information includes a first identifier and a predetermined distance between the first tag and the second tag, and wherein the second information includes a second identifier and the predetermined distance; and
a computing system controlling functionality of the vehicle for processing the first time stamp, the second time stamp, and the predetermined distance to determine a second measured speed of the vehicle based on dividing the predetermined distance by an elapsed time between the first time stamp and the second time stamp which is compared with a first measured speed of the vehicle measured by a speedometer operably connected to the computing system, wherein the speedometer is calibrated based on a speed difference between the first measured speed and the second measured speed, and wherein calibration of the speedometer is performed based on driver input.

16. The system of claim 15, wherein the computing platform further comprises:
a display system for displaying the speed difference to a driver;
an alert system for alerting the driver that the second measured speed of the vehicle exceeds a safe driving speed; and
a communication system for communicating with individuals and devices to alert the individuals and devices that the second measured speed of the vehicle exceeds the safe driving speed.

17. The system of claim 15, wherein the first tag and the second tag are part of any of a roadway, lane indicators, paint, speed bumps, guard rails, curbs, and reflector poles.

18. A computer program product comprising a computer usable medium including computer usable program code for calibrating a speedometer of a vehicle, the computer program product comprising:
computer usable program code for receiving first information from a first radio frequency identification tag by the vehicle;
computer usable program code for receiving second information from a second radio frequency identification tag by the vehicle;
computer usable program code for determining a first measured speed of the vehicle based on a reading from the speedometer;
computer usable program code for determining a second measured speed of the vehicle based on dividing a predetermined distance provided by at least one of the first information or the second information by an elapsed time between when the first information was read and the second information was read; and
computer usable program code for calibrating the speedometer based on a speed difference between the first measured speed and the second measured speed, wherein the calibrating is performed based on driver input.

19. A computer implemented method for calibrating an odometer of a vehicle, the computer implemented method comprising:
receiving a first value of a first radio frequency identification tag by the vehicle;
responsive to receiving the first value of the first radio frequency identification tag, reading a first mileage of the odometer in the vehicle;
receiving a second value of a second radio frequency identification tag by the vehicle, wherein the second radio frequency identification tag is located at a predetermined distance from a location of the first radio frequency identification tag;
responsive to receiving the second value of the second radio frequency identification tag, reading a second mileage of the odometer;
determining an odometer distance using the first mileage and the second mileage;
identifying an odometer error by comparing the odometer distance with the predetermined distance; and
calibrating the odometer of the vehicle by adjusting the odometer using the odometer error, wherein the calibrating is performed based on driver input.

* * * * *